United States Patent
Ide et al.

(10) Patent No.: US 9,162,184 B2
(45) Date of Patent: Oct. 20, 2015

(54) EXHAUST GAS PURIFICATION SYSTEM FOR INTERNAL COMBUSTION ENGINE

(75) Inventors: Kazunari Ide, Tokyo (JP); Yoshikatsu Ikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 459 days.

(21) Appl. No.: 13/807,408

(22) PCT Filed: Aug. 22, 2011

(86) PCT No.: PCT/JP2011/068863
§ 371 (c)(1),
(2), (4) Date: Dec. 28, 2012

(87) PCT Pub. No.: WO2012/043093
PCT Pub. Date: Apr. 5, 2012

(65) Prior Publication Data
US 2013/0108511 A1 May 2, 2013

(30) Foreign Application Priority Data
Sep. 27, 2010 (JP) .................. 2010-216085

(51) Int. Cl.
*F01N 3/025* (2006.01)
*F01N 3/00* (2006.01)
(Continued)

(52) U.S. Cl.
CPC ............ *B01D 53/9495* (2013.01); *F01N 9/002* (2013.01); *F01N 13/0097* (2014.06); *F02D 41/029* (2013.01); *F02D 41/1445* (2013.01); *F01N 3/106* (2013.01); *F01N 2900/0408* (2013.01); *F01N 2900/0418* (2013.01); *F01N 2900/1602* (2013.01); *F02B 37/00* (2013.01); *F02D 2041/141* (2013.01);

(Continued)

(58) Field of Classification Search
None
See application file for complete search history.

(56) References Cited

U.S. PATENT DOCUMENTS

| 2001/0023684 A1 | 9/2001 | Demura et al. | |
|---|---|---|---|
| 2004/0244366 A1* | 12/2004 | Hiranuma et al. | .............. 60/286 |
| 2007/0130925 A1 | 6/2007 | Ueno | |

FOREIGN PATENT DOCUMENTS

| CN | 1940258 A | 4/2007 |
|---|---|---|
| EP | 1 515 017 A2 | 3/2005 |

(Continued)

OTHER PUBLICATIONS

Decision to grant a patent issued Oct. 2, 2014 in corresponding Japanese Application No. 2010-216085 (with English translation).

(Continued)

*Primary Examiner* — Walter D Griffin
*Assistant Examiner* — Jelitza Perez
(74) *Attorney, Agent, or Firm* — Wenderoth, Lind & Ponack, L.L.P.

(57) ABSTRACT

An exhaust gas purification system includes a feedforward controller 47, a feedback controller 49 outputting a correcting variable for achieving a target temperature of DPF 7, and a variable adding unit 51 that adds the correcting variable output from the feedback controller 49 to a basic variable output from the feedforward controller 47 to compute a manipulated variable. The system further includes either one of an integrator resetter 55 that resets the integral value of an integrator that forms the feedback controller 49 when the amount of exhaust gas has suddenly dropped, and a basic variable calculating unit that calculates the basic variable to be output from the feedforward controller based on a signal representing the flow rate of exhaust gas.

16 Claims, 8 Drawing Sheets

(51) Int. Cl.
*F01N 3/035* (2006.01)
*B01D 53/94* (2006.01)
*F01N 9/00* (2006.01)
*F02D 41/02* (2006.01)
*F02D 41/14* (2006.01)
*F01N 13/00* (2010.01)
*F01N 3/10* (2006.01)
*F02B 37/00* (2006.01)

(52) U.S. Cl.
CPC ............... *F02D 2041/1409* (2013.01); *F02D 2041/1422* (2013.01); *F02D 2200/0802* (2013.01); *Y02T 10/47* (2013.01)

(56) References Cited

FOREIGN PATENT DOCUMENTS

| | | |
|---|---|---|
| JP | 4-308309 | 10/1992 |
| JP | 2001-263144 | 9/2001 |
| JP | 2005-90276 | 4/2005 |
| JP | 2005-90454 | 4/2005 |
| JP | 2005-320962 | 11/2005 |
| JP | 2007-162568 | 6/2007 |
| JP | 2009-47114 | 3/2009 |

OTHER PUBLICATIONS

The First Office Action issued Oct. 29, 2014 in corresponding Chinese Application No. 201180031619.3, with English translation.

International Search Report issued Sep. 13, 2011 in corresponding International Application No. PCT/JP2011/068863.

Notice of Allowance issued Jun. 15, 2015 in corresponding Chinese Application No. 201180031619.3 (with English translation).

* cited by examiner

EXHAUST GAS PURIFICATION SYSTEM FOR INTERNAL COMBUSTION ENGINE

TECHNICAL FIELD

The present invention relates to a diesel engine exhaust gas purification system, and more particularly to the control of temperature at the inlet of a diesel particulate filter (hereinafter, DPF) that collects particulate matter (hereinafter, PM) contained in the exhaust gas, during regeneration of the DPF.

BACKGROUND ART

PM reduction is as important as $NO_X$ reduction in exhaust gas regulations of diesel engines, DPF is known as an effective technique in this regard.

DPF is a PM collecting device that uses a filter. As the PM continues to accumulate in the DPF in engine operating conditions with low exhaust gas temperatures, forced regeneration is carried out wherein the temperature is forcibly raised to burn the PM.

Common means of raising the temperature include delaying the fuel injection timing, post-injection, and intake throttling, which all encompass the problem of adversely affecting the fuel economy. On the other hand, higher temperatures mean a quick and efficient forced regeneration of DPF with a smaller decrease of fuel economy since the higher the temperature, the higher the speed of burning the PM.

However, if the DPF temperature is too high, the PM burn rapidly and the DPF temperature rises quickly, which may damage the DPF or deteriorate the catalyst carried in the DPF.

Temperature control is therefore necessary, to maintain the DPF temperature at a level suitable for the regeneration, so as to prevent a drop in the fuel economy and ensure safe regeneration of the DPF.

There is Japanese Patent Application Laid-open No. 2005-320962 (Patent Document 1) as an example of temperature raising control in forced regeneration of DPF. The Patent Document 1 describes a process of temperature control during regeneration of DPF wherein an optimal feedback gain in accordance with the operating condition is used to achieve both of stability and responsivity of temperature feedback control to raise the temperature to a target level.

There is a time delay between variable manipulation to raise the temperature and a change in the exhaust gas temperature. The time delay of control targets also varies depending on the changes in the operating condition. For example, an increase in the exhaust gas flow rate increases the heat transfer coefficient and decreases the time delay, while a decrease in the exhaust gas flow rate increases the time delay between changes in variable and changes in exhaust gas temperature as well as the time constant, whereby the time delay is increased.

Described in the document is a corrective action performed in consideration of the time delay to make the temperature closer to the target level quickly, wherein the operating condition is detected to determine the current time delay from the relationship between the exhaust gas flow rate and the time delay that is known from the operating condition, an optimal feedback gain is calculated in accordance therewith, and the temperature raising variables are corrected using this feedback gain.

Patent Document 1: Japanese Patent Application Laid-open No. 2005-320962

Patent Document 1 describes making the temperature closer to a target level quickly by correcting a feedback gain as described above. However, it is not possible to improve the stability of control of the DPF inlet temperature by a corrective action using only a feedback gain, particularly when the exhaust gas flow rate has decreased, since, in such a condition, the time delay between changes in variable (post-injection amount) and changes in exhaust gas temperature is increased, and so is the time constant, because of which the exhaust gas temperature control performance is deteriorated, i.e., it takes long until a change appears in the DPF inlet temperature even when, for example, the post-injection amount is excessive.

If the temperature is controlled properly by feedforward control at various operating condition points, the feedback variables will be zero in a steady state and the problem associated with the feedback control described above will not arise. In a small general-purpose engine, however, in which the rpm and the load change independently in use, it is difficult to set the feedforward variables properly in all operating conditions.

If, for example, the flow rate of the exhaust gas has dropped largely in a short time, and the flow rate remains low after that, the DPF inlet temperature will rise, and when this phenomenon appears, it is difficult to solve it by improvement of the gain in the feedback control, or by optimization of controlled variables in the feedforward control.

DISCLOSURE OF THE INVENTION

Accordingly, the present invention was made in view of these problems, and it is an object of the invention to provide an exhaust gas purification system for an internal combustion engine capable of stable control to keep the DPF inlet temperature at a target level even when the flow rate of exhaust gas remains low after a sudden drop in the flow rate.

To solve the problems described above, the present invention provides an exhaust gas purification system for an internal combustion engine that includes a diesel oxide catalyst (DOC) and a diesel particulate filter (DPF) for collecting particulate matter (PM) in exhaust gas in an exhaust gas passage and that treats the PM collected in the DPF to regenerate the DPF, the system including: a regeneration control unit controlling a temperature raising unit, when the PM has accumulated more than a predetermined amount, to heat up the DPF to around a predetermined target temperature to burn off the accumulated PM, the regeneration control unit including a feedforward controller outputting a basic variable for the temperature raising unit based on an operating condition of the internal combustion engine, a feedback controller outputting a correcting variable for achieving the target temperature of the DPF, and a variable adding unit adding the correcting variable output from the feedback controller to the basic variable output from the feedforward controller to compute a manipulated variable. The system further includes at least one of an integrator resetter resetting an integral value of an integrator forming the feedback controller when a sudden drop in exhaust gas flow rate is detected based on a monitored exhaust gas flow rate or a control value calculated from the exhaust gas flow rate, and a basic variable calculating unit calculating the basic variable to be output from the feedforward controller based on the exhaust gas flow rate or a control value calculated from the exhaust gas flow rate.

According to the invention, there is provided an integrator resetter that resets the integral value of the integrator forming the feedback controller when a sudden drop in the flow rate of exhaust gas is detected based on the flow rate of exhaust gas passing through the DPT or a control value calculated from the exhaust gas flow rate, so that the late post-injection amount, which is the manipulated variable to raise the temperature, is prevented from being adversely affected by the integral value remaining in the integrator in the PID controller. As a result, the DPT inlet temperature can be kept at around the target level even when the flow rate of exhaust gas has dropped suddenly.

The feedforward controller outputs a basic variable for the temperature raising unit based on the operating condition of the internal combustion engine. In an operating condition in which the flow rate of the exhaust gas has decreased suddenly and remains low for a while, in the conventional technique, when there was (accumulated) still an integral value before the sudden drop of the exhaust gas flow rate in the integrator of the feedback controller, the response of the DPF inlet temperature was slow (deadtime was long) particularly when the flow rate was decreasing, so that it would take time to output accumulated integral value, during which the integral values are added as correcting variables, whereby the DPF inlet temperature was raised, resulting in a loss of the controllability.

In the present invention, as there is provided an integrator resetter that resets the integral value of the integrator, such loss of controllability of the DPF inlet temperature caused by a remaining integral value is prevented.

Alternatively, there is provided a basic variable calculating unit calculating a basic variable of the feedforward controller based on the flow rate of exhaust gas or a control value calculated from the exhaust gas flow rate. Namely, there is provided a basic variable calculating unit calculating a basic variable by using an equation, more specifically, a transfer function that models the temperature rising characteristics of the exhaust gas in the DOC, so that proper basic variables can be obtained under various operating conditions.

Therefore, as compared to using a map prepared based on various operating conditions beforehand, the feedforward manipulated variables can be properly determined under various operating conditions of a small general-purpose engine, in which the rpm and the load independently change in use, and thus the controllability of the DPF inlet temperature can be improved.

In the present invention, preferably, it may be determined that there has been a sudden drop in the flow rate of exhaust gas when any of the following applies:

(1) The rate of decrease of the exhaust gas flow rate is not higher than a threshold;

(2) The exhaust gas flow rate has decreased to a threshold or below; or (3) The rate of decrease of the exhaust gas flow rate is not higher than a threshold as well as the exhaust gas flow rate has decreased to less than a threshold.

By monitoring the exhaust gas flow rate as well as the rate of decrease in the flow rate, the integrator value is prevented from being reset more than necessary, despite frequent sudden drops in the exhaust gas flow rate during transient operation. This prevents a loss of controllability of the DPF inlet temperature during transient operation when the engine rpm and the engine load continuously change.

Or, (4) The flow rate of the exhaust gas remains not higher than the threshold for a certain period of time or longer.

With the additional condition, wherein the flow rate of exhaust gas remains less than the threshold for more than a certain period of time, unnecessary resetting of the integral value during transient operation is prevented even more reliably.

In the present invention, preferably, the integral value of the integrator of the PID controller forming the feedback controller may be reset when the integral value is positive.

By resetting the integral value only when it is positive, an unintended increase in the DPF inlet temperature caused by a resetting action can be prevented. Namely, it is for preventing an unintended increase in the DPF inlet temperature, which would occur if the integral value of the integrator of the feedback controller is reset when the integral value is negative.

In the present invention, preferably, the basic variable calculating unit may calculate the basic variable of the feedcontroller by using a preset equation of a transfer function modeling the temperature rising characteristics of the exhaust gas in the DOC in use of a deviation of a measured DOC inlet temperature from the target DPF inlet temperature, and a control gain calculated based on the exhaust gas flow rate.

Namely, the temperature rising characteristics of the exhaust gas in the DOC are modeled by a primary transfer function, and a late post-injection amount that can achieve a target DPF inlet temperature is obtained through calculation as the basic variable of the feedforward controller.

More specifically, the late post-injection amount Z, or a basic variable, is determined using a relational expression of the primary transfer function $Z=K/(1+\sigma s)e$, wherein e is the deviation of a measured DOC inlet temperature from the target DPF inlet temperature, $\sigma$ is the time constant parameter and K is the control gain determined from the flow rate of exhaust gas.

The smaller the design parameter (adjusting parameter) $\sigma$ is set, the higher the sensitivity of the output will be relative to changes in temperature deviation e and K, and the larger $\sigma$ is set, the lower the responsivity.

The late post-injection amount, which is the basic variable, is calculated using a control gain, which is a control value obtained from the exhaust gas flow rate, instead of setting proper basic variables by the feedforward controller at various operating condition points, so that, as compared to using a map prepared based on various operating conditions beforehand, the feedforward variables can be properly determined under various operating conditions.

Since the late post-injection amount, which is the basic variable, is determined based on the deviation of the measured DOC inlet temperature from the target value of the DPF inlet temperature, the integrator of the PID controller does not output a large value, i.e., a large deviation from the target DPF inlet temperature is unlikely to occur, so that a loss of the controllability of the DPF inlet temperature is prevented under an operating condition in which the flow rate of exhaust gas remains low after a drop in the exhaust gas flow rate in a short time.

In the present invention, preferably, the manipulated variable of the temperature raising unit may represent an amount of late post-injection that is performed in a period after a main injection and does not directly contribute to combustion, after activation of the DOC.

The manipulated variable of the temperature raising unit should preferably represent an amount of late post-injection that is performed in a period after a main injection and does not directly contribute to combustion, after activation of the DOC.

The late post-injection in the present invention snail be described here.

Main injection is done to bring about main combustion in the combustion chamber. Early post-injection refers to an injection of fuel in a smaller amount than that of the main injection performed immediately after the main injection when the pressure inside the cylinder is still high. This early post-injection raises the temperature of the exhaust gas, and the hot exhaust gas flowing into the DOC activates the DOC.

A second post-injection is performed after that, when the crank angle is near the bottom dead center after the early post-injection. This second post-injection is called late post-injection, which does not contribute to the combustion inside the combustion chamber, so that the fuel is discharged from the combustion chamber into the exhaust gas passage in the exhaust stroke. This fuel discharged from the combustion chamber reacts in the already activated DOC, and the heat thus generated by oxidation further raises the exhaust gas temperature to a level of about 600° C. necessary for the regeneration of the DPF, to promote burning of the PM.

According to the present invention, there is provided an integrator resetter that resets the integral value of the integrator forming the feedback controller when a sudden drop in the flow rate of exhaust gas is detected based on the flow rate of exhaust gas passing through the DPF or a control value calculated from the exhaust gas flow rate, so that the late post-injection amount, which is the manipulated variable to raise the temperature, is prevented from being adversely affected by the integral value remaining in the integrator in the PID controller. As a result, the DPF inlet temperature can be kept at around the target level even when the flow rate of exhaust gas has dropped suddenly.

Alternatively, there is provided a basic variable calculating unit calculating a basic variable of the feedforward controller based on the flow rate of exhaust gas passing through the DPF or a control value calculated from the exhaust gas flow rate, so that proper basic variables can be obtained through calculation under various operating conditions. Therefore, as compared to using a map prepared based on various operating conditions beforehand, the feedforward manipulated variables can be properly determined under various operating conditions of a small general-purpose engine, in which the rpm and the load independently change in use, and thus the controllability of the DPF inlet temperature can be improved.

As the controllability of the DPF inlet temperature is improved, the target temperature at the DPF inlet can be set several tens of ° C. higher without the possibility of the DPF reaching the temperature at which the catalyst held therein is degraded. Thus thermal degradation of the catalyst held in the DPF is prevented, whereby the durability of the DPF is improved.

As the target temperature at the DPF inlet can be set higher, the time for controlling the DPF regeneration is reduced, whereby the problem of oil dilution caused by late post-injection at the time of regeneration is resolved.

BEST MODE FOR CARRYING OUT THE INVENTION

The illustrated embodiments of the present invention will be hereinafter described in detail. It should be noted that, unless otherwise particularly specified, the sizes, materials, shapes, and relative arrangement or the like of constituent components described in these embodiments are not intended to limit the scope of this invention.

The overall configuration of the diesel engine exhaust gas purification system according to the present invention will be described with reference to FIG. 1.

Figure 1:
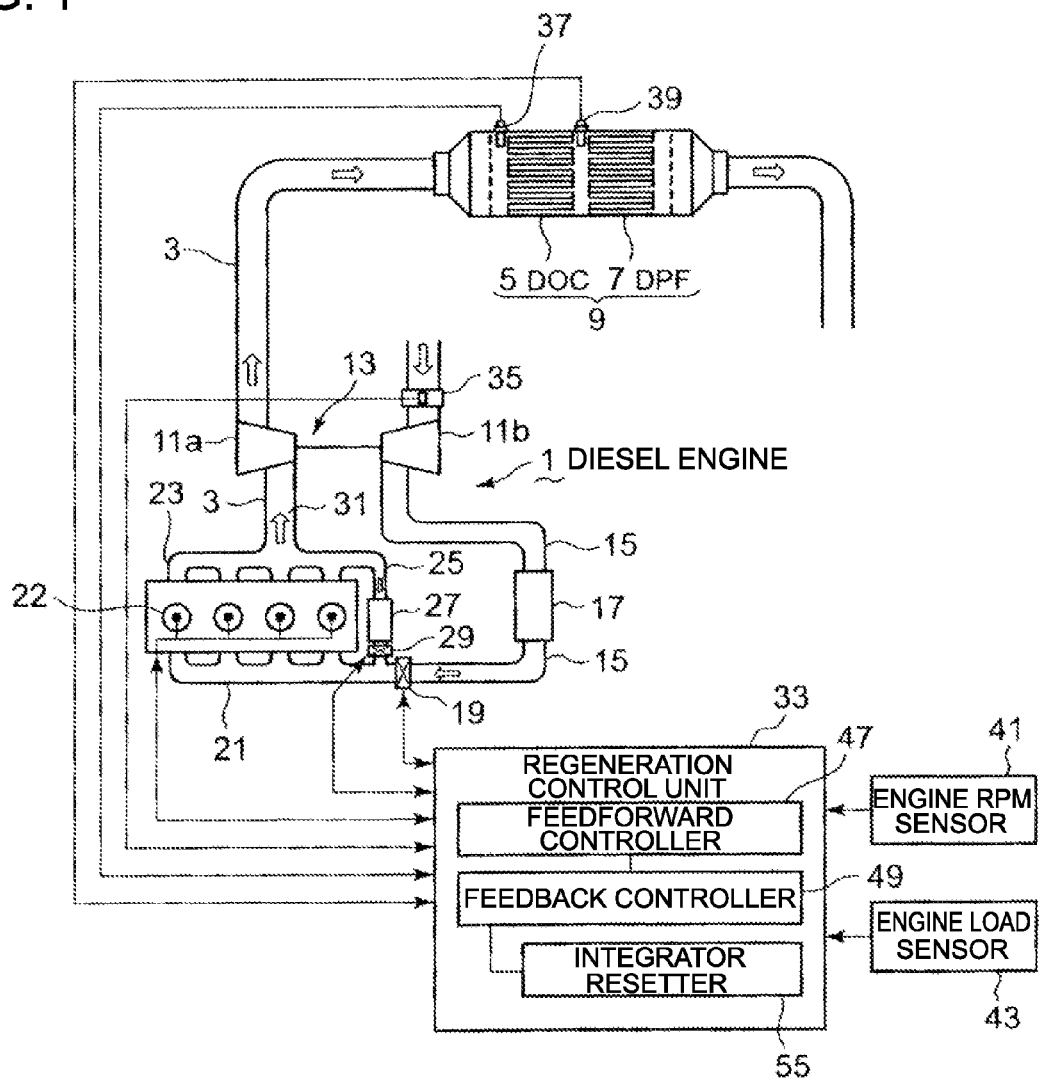
FIG. 1 is a schematic configuration diagram of a diesel engine exhaust gas purification system according to one embodiment of the present invention.

As shown in FIG. 1, an exhaust gas passage 3 of a diesel engine (hereinafter referred to as engine) includes an exhaust gas after treatment system 9 including a DOC (oxidation catalyst) 5 and a DPF (particulate filter) 7 that collects soot downstream of the DOC 5.

In the exhaust gas passage 3 is also disposed an exhaust gas turbocharger 13 having an exhaust gas turbine 11a and a compressor 11b coaxially driven with the turbine. Intake air discharged from the compressor 11b of the exhaust gas turbocharger 13 flows through an intake air passage 15 and enters an intercooler 17 to be cooled. An intake throttle valve 19 controls the amount of intake air flowing therethrough, and after that, the air flows from an intake manifold 21 into combustion chambers through intake ports of respective cylinders via intake valves of the engine 1.

Although not shown, the engine 1 includes a common rail fuel injection system that controls the timing of injection, and the amount and pressure of fuel to be injected into the combustion chambers. The common rail fuel injection system feeds fuel at a predetermined controlled pressure to the fuel injection valves 22 of the respective cylinders at a predetermined timing of injection.

An exhaust gas recirculation (EGR) passage 25 bifurcates from midway of the exhaust gas passage 3 or an exhaust manifold 23 so as to introduce part of the exhaust gas to a portion downstream of the intake throttle valve 19 through an EGR cooler 27 and an EGR valve 29.

Combustion gas or exhaust gas 31 produced in the combustion chambers of the engine 1 flows through the exhaust manifold 23 that connects to each of the exhaust ports of the cylinders and through the exhaust passage 3, and spins the exhaust gas turbine 11a of the exhaust gas turbocharger 13 to drive the compressor 11b, after which it flows into the exhaust gas after treatment system 9 through the exhaust gas passage 3.

The DPF 7 is disposed downstream of the DOC 5. The regeneration control unit 33 of the DPF 7 receives signal inputs from an air flowmeter 35 that detects the amount of air flowing into the compressor 11b, a DOC inlet temperature sensor 37, and a DPF inlet temperature sensor 39.

Signals from an engine rpm sensor 41 and an engine load sensor 43 are also input to the regeneration control unit (ECU) 33.

This regeneration control unit 33 controls a temperature raising unit when the amount of PM accumulated in the DPF 7 exceeds a predetermined level to raise the temperature at the inlet of the DPF 7 to around a target level (of about 600° C.) to burn off the accumulated PM.

The outline of the control by the regeneration control unit 33 to burn off the PM will be described first.

When conditions for starting forced regeneration are met, which is determined based on, for example, mileage, running time of the engine, a total amount of fuel consumed, in the case with a vehicle, and when the forced regeneration is started, the DOC temperature raising control is executed to activate the DOC 5. This DOC temperature raising control involves reducing the degree of opening of the intake throttle valve 19 to reduce the amount of air flowing into the combustion chambers, so as to increase unburnt fuel in the exhaust gas. A first post-injection is then performed, wherein a smaller amount of fuel than the main injection is injected immediately after the main injection when the pressure inside the cylinders is still high, this early post-injection raising the exhaust gas temperature without affecting the engine output. The high-temperature exhaust gas flows into and activates the DOC 5, and as the unburnt fuel in the exhaust gas is oxidized by the activated DOC 5, the exhaust gas temperature is further raised by the heat generated from the oxidation.

When the DOC inlet temperature is determined to have reached and exceeded a predetermined level, a late post-injection is carried out to further raise the inlet temperature of the DPF 7. The late post-injection refers to a second post-injection after the early post-injection mentioned above, wherein fuel is injected when the crank angle is near the bottom dead center. By this late post-injection, fuel flows out from the combustion chambers to the exhaust gas passage 3 when the exhaust valves are open. The discharged fuel reacts at the activated DOC 5, so that the exhaust gas temperature is further raised by the heat generated from the oxidation to achieve a temperature necessary for the regeneration of the DPF 7, e.g. 600° C., to promote burning of the PM.

First Embodiment

Figure 2:
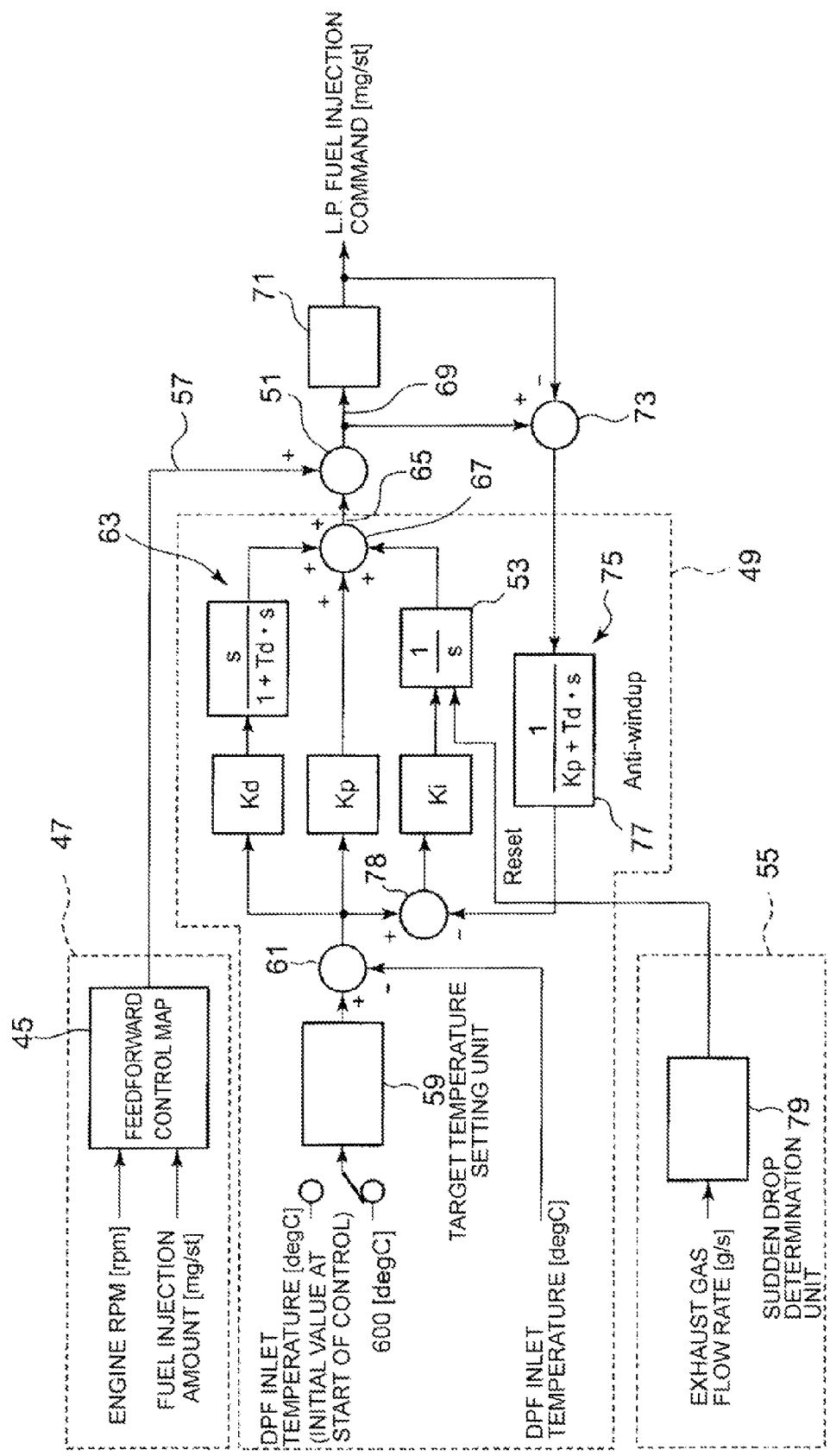
FIG. 2 is a configuration block diagram showing a first embodiment of a regeneration control unit.

Next, a first embodiment of the control of the amount of late post-injection by the regeneration control unit 33 will be described with reference to the control configuration block diagram of FIG. 2.

The regeneration control unit 33 controls the amount of the late post-injection (manipulated variable) to constantly keep the inlet temperature of the DPF 7 at the setpoint of about 600° C. and for that purpose includes: A feedforward controller 47 that outputs a command indicative of a basic injection amount (basic variable) of late post-injection based on a feedforward control map 45 that defines basic injection amounts preset in accordance with the engine rpms and fuel injection amounts (engine loads); a feedback controller 49 that outputs a command indicative of a correction amount of late post-injection (correcting variable) for achieving the target temperature of the DPF 7; and an injection amount (manipulated variable) adding unit 51 (see FIG. 2) that computes an amount of injection by adding the correction amount output from the feedback controller 49 to the basic injection amount output from the feedforward controller 47.

In the first embodiment, an integrator resetter 55 is further provided for resetting the integral value of an integrator 53 that forms part of the feedback controller 49.

The feedforward controller 47 computes a basic injection amount, which is a feedforward control command 57, based on the feedforward control map 45 that defines basic amounts of injection preset in accordance with the engine rpms and fuel injection amounts (engine loads) that represent various operating conditions of the engine, as described above.

The feedback controller 49, on the other hand, includes a target temperature setting unit 59 that sets an initial target value of the DPF 7 inlet temperature at the start of the control and a target temperature thereafter. The feedback controller inputs a target DPF 7 inlet temperature and the measured DPF 7 inlet temperature to an adder-subtracter 61, and performs feedback calculation at a PID controller 63 using the deviation of the measured inlet temperature from the target inlet temperature obtained as an output signal of the adder-subtracter 61 to compute a correction amount of injection as a feedback control command 65.

The PID controller 63 calculates the proportional element (P) using a proportional gain Kp, the derivative element (D) using a derivative gain Kd, and the integral element (I) using an integral gain Ki, and the calculation results are all input to an adder 67 so as to compute the feedback control command 65.

The feedforward control command 57 and the feedback control command 65 are input to the adder (injection amount adding unit) 51, which outputs an addition command 69. This addition command signal 69 is input to a command saturation unit 71 to set a limit to the output signal for protection of the DPF 7. The signal that has passed through the command saturation unit 71 is output as a late post-injection command signal.

Further, a PID auto-tuner 75 is provided for automatically tuning the feedback controller 49. The auto-tuning is based on a deviation between the output signal of the command saturation unit 71 and the output signal of the adder 51, which is provided from an adder/subtractor 73. The output signal from a calculation element 77 of the PID auto-tuner 75 is input to an adder-subtractor 78 to be input to the integrator 53.

The PID auto-tuner 75 provided as an anti-windup measure (for preventing input saturation) of the feedback controller 49 prevents the integral value of the integrator 53 of the PID controller 63 in the feedback controller 49 from accumulating while the command saturation unit 71 is limiting the command. Thereby, the command following capability is improved when the setpoint of the feedback control is changed.

In the first embodiment, there is further provided the integrator resetter 55 that resets the integral value of the integrator 53. This integrator resetter 55 includes a sudden drop determination unit 79 that determines whether or not the flow rate of exhaust gas has dropped suddenly, so that the integral value of the integrator 53 is reset when this sudden drop determination unit 79 detects a sudden drop in the exhaust gas flow rate.

The control flow of this integrator resetter 55 will be described with reference to FIG. 4. Step S1 of FIG. 4 is shown in detail in FIG. 5($a$), step S2 is shown in detail in FIG. 5($b$), step S3 is shown in detail in FIG. 5($c$), and step S4 is shown in detail in FIG. 5($d$).

Figure 4:
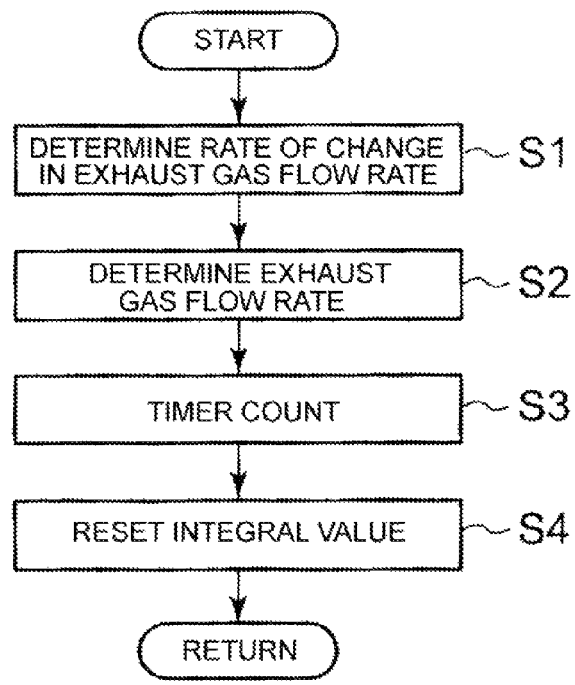
FIG. 4 is a control flowchart of the first embodiment.

First, the rate of change in the flow rate of exhaust gas is determined at step S1 in FIG. 4. This is done, as shown in FIG. 5($a$), by first calculating the flow rate $G_{ex}$ of exhaust gas at step S11. The exhaust gas flow rate is calculated based on a signal indicative of the flow rate of air $G_a$ from the air flowmeter 35, and a signal indicative of the fuel injection command $G_f$ from the common rail fuel injection system (not shown), by the equation $G_{ex} = G_a + G_f$. Next, the time derivative $dG_{ex}/dt$ of the exhaust gas flow rate $G_{ex}$ is calculated at step S12. Step S13 determines whether or not the time derivative $dG_{ex}/dt$ is less than a threshold K1, and if yes, Flag 1 is turned on at step S14, and if not, Flag 1 is turned off at step S15, after which the process is returned.

Referring back to the flow of FIG. 4, the flow rate of exhaust gas is determined at step S2. As shown in FIG. 5($b$), step S21 determines whether or not the exhaust gas flow rate $G_{ex}$ is less than a threshold K2, and if yes, Flag 2 is turned on at step S22, and if not, Flag 1 is turned off at step S23, after which the process is returned.

Figure 5A:
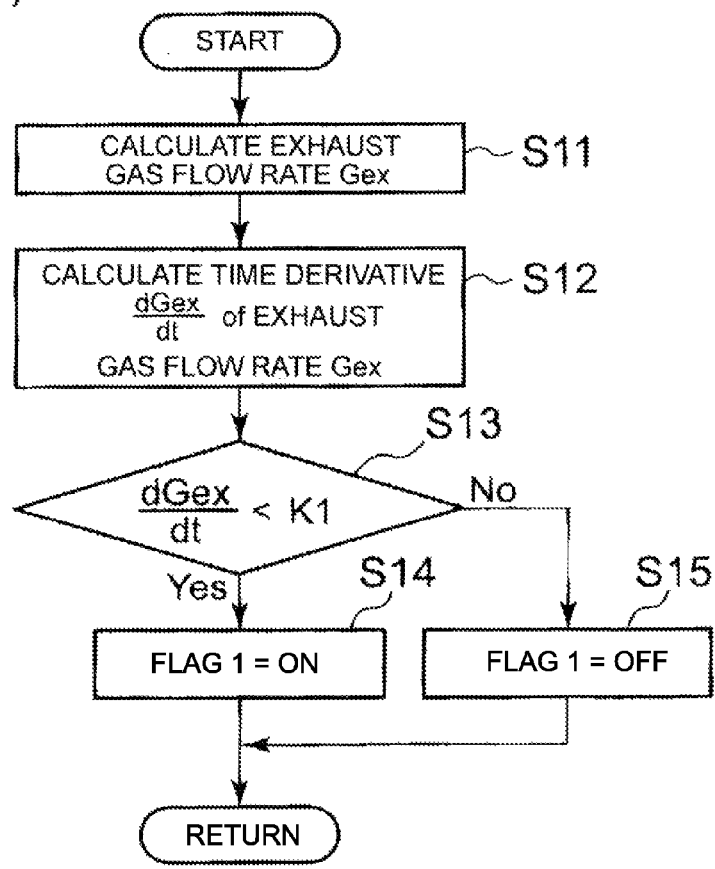
FIG. 5(a) is a subroutine flowchart showing one of the steps of the flowchart of FIG. 4 in detail.
Figure 5B:
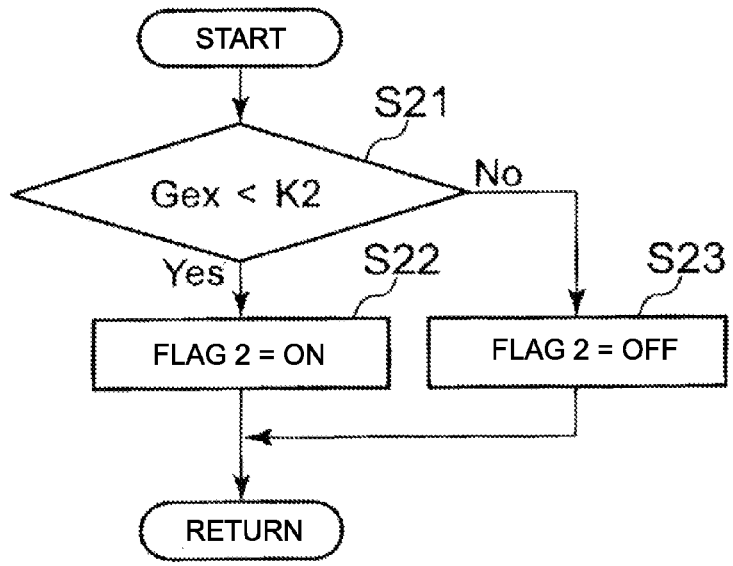
FIG. 5(b) is a subroutine flowchart showing one of the steps of the flowchart of FIG. 4 in detail.
Figure 5C:
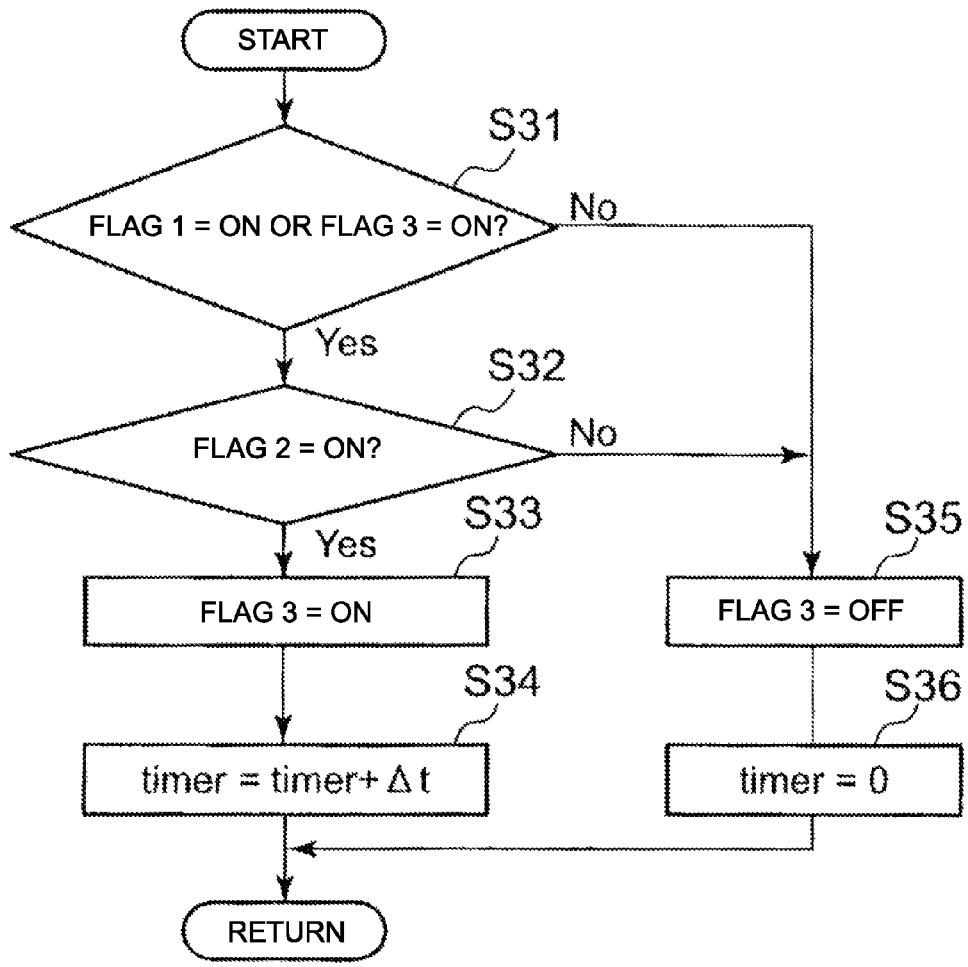
FIG. 5(c) is a subroutine flowchart showing one of the steps of the flowchart of FIG. 4 in detail.

Next, the timer counts up at step S3 in the flow of FIG. 4. As shown in FIG. 5(c), step S31 determines whether or not Flag 1 is ON or Flag 3 is ON, and if yes, step S32 determines whether or not Flag 2 is ON. If "No" at step S31, Flag 3 is turned off at step S35, and the timer is set to zero at step S36.

If step S32 determines that Flag 2 is ON, Flag 3 is turned on at step S33, and Δt (cyclic time for processing the subroutine) is added to the timer at step S34.

Figure 5D:
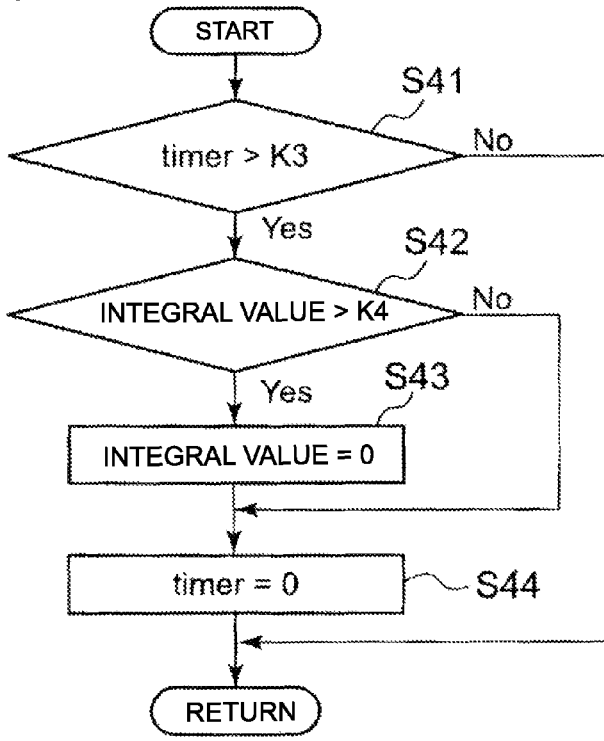
FIG. 5(d) is a subroutine flowchart showing one of the steps of the flowchart of FIG. 4 in detail.

Next, the integral value is reset at step S4 in the flow of FIG. 4. As shown in FIG. 5(d), step S41 determines whether or not the timer count exceeds a threshold K3, and if not, the process is returned, and if yes, step S42 determines whether or not the integral value exceeds a threshold K4. This is done by setting K4=0, for example, if the integral value is positive.

If the integral value is positive, the process goes to step S43, where the integral value is reset to zero. The timer is reset at step S44 and the process is returned.

As described above, the sudden drop determination unit 79 determines that there has been a sudden drop in the flow rate of exhaust gas by determining the rate of change in the flow rate of exhaust gas at step S1 and further by determining the flow rate of exhaust gas at step S2, so that, despite frequent sudden drops in the exhaust gas flow rate during transient operation, the integral value is prevented from being reset more than necessary by thus monitoring the exhaust gas flow rate as well as the rate of decrease in the flow rate.

This prevents a loss of controllability of the DPF inlet temperature during transient operation when the engine rpm and the engine load continuously change.

Furthermore, it is determined at step S3 that there has been a sudden drop in the exhaust gas flow rate when the condition in which the exhaust gas flow rate is not higher than the threshold has continued for more than a certain period of time. Namely, with the additional condition for the determination, wherein the flow rate of exhaust gas remains not higher than the threshold for a certain period of time or longer as determined at step S41, unnecessary resetting of the integral value during transient operation is prevented even more reliably.

Figure 8:
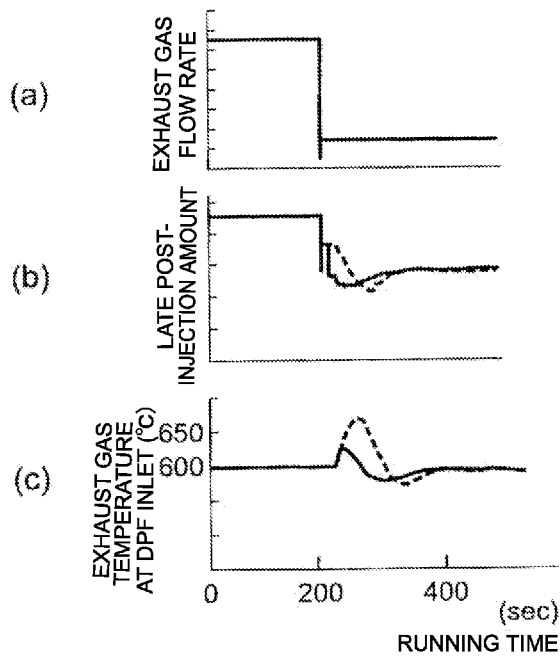
FIG. 8 is a diagram for explaining the confirmation test results of the first embodiment.

FIG. 8 shows the confirmation test results. FIG. 8(a) shows the flow rate of exhaust gas, which was decreased stepwise from a steady state. FIG. 8(b) shows the changes in the late post-injection amount at this time, while FIG. 8(c) shows the changes in the temperature of the exhaust gas at the DPF inlet. Dotted lines in FIGS. 8(b) and 8(c) represent a conventional technique in which the integrator resetter 55 is not provided, while solid lines represent the present invention having the integrator resetter 55.

FIG. 8(b) shows that the late post-injection amount is decreased with a faster response speed than the conventional technique. FIG. 8(c) shows that the exhaust gas temperature at the DPF inlet is prevented from overshooting.

As described above, the first embodiment includes the integrator resetter 55 that resets the integral value of the integrator 53 forming the feedback controller 49 when the sudden drop determination unit 79 determines that the flow rate of exhaust gas has dropped suddenly based on the flow rate of exhaust gas passing through the DPF 7 or the rate of decrease in the exhaust gas flow rate (control value) that is the time derivative of the flow rate. Thereby, the late post-injection amount, which is the manipulated variable to raise the temperature, is prevented from being adversely affected by the integral value remaining in the integrator 53 in the PID controller 63. As a result, the DPF inlet temperature can be reliably kept at around the target level even when the flow rate of exhaust gas has dropped rapidly.

As the controllability of the DPF inlet temperature is improved, the target temperature at the DPF inlet can be set several tens of ° C. higher without the possibility of the DPF 7 reaching the temperature at which the catalyst held therein is degraded. Thus thermal degradation of the catalyst held in the DPF is prevented, whereby the durability of the DPF 7 is improved.

As the target temperature at the DPF inlet can be set higher, the time for controlling the DPF regeneration is reduced, whereby the problem of oil dilution caused by late post-injection at the time of regeneration is resolved.

Second Embodiment

Next, a second embodiment of the control of the amount of late post-injection by the regeneration control unit 33 will be described with reference to the control configuration block diagram of FIG. 3.

The feedforward controller 47 is the same as that of the first embodiment and therefore will not be described again. The integrator resetter 55 of the first embodiment is not provided here. The second embodiment is characteristic in that it has a different feedforward controller than that (47) of the first embodiment.

Figure 3:
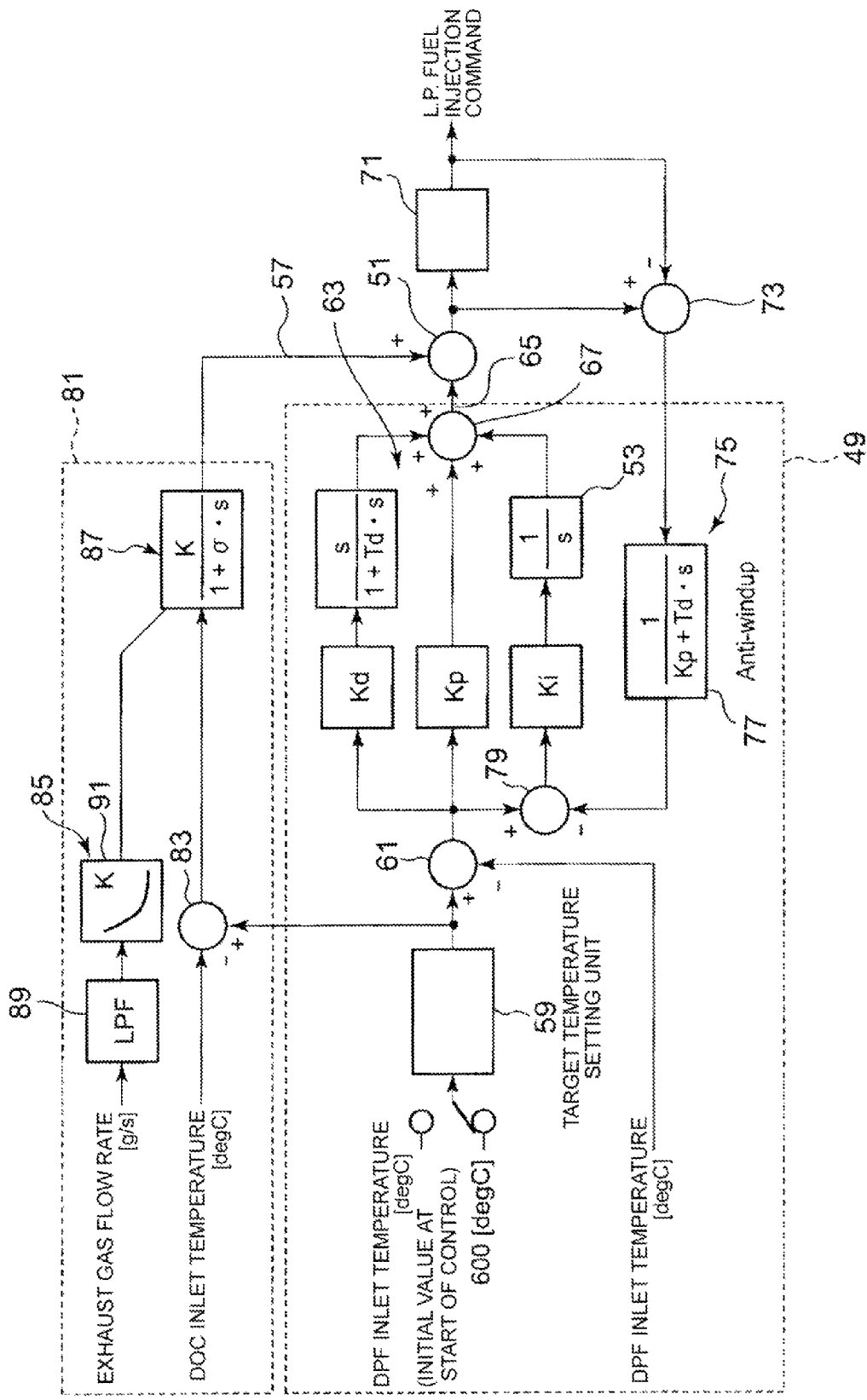
FIG. 3 is a configuration block diagram showing a second embodiment of the regeneration control unit.

As shown in FIG. 3, unlike the first embodiment, the feedforward controller 81 of the second embodiment does not output a command indicative of a basic injection amount (basic variable) of late post-injection based on a map that defines feedforward commands determined through tests and preset beforehand in accordance with various operating conditions. Instead, the feedforward controller outputs a command indicative of a basic injection amount that it calculates based on actual measurements of the exhaust gas flow rate and the inlet temperature of the DOC 5 using a preset DOC transfer function model.

The feedforward controller 81 includes an adder-subtractor (deviation calculating unit) 83 that calculates a deviation e of a measured DOC inlet temperature from the target DPF inlet temperature, a gain calculating unit 85 that calculates a control gain (control value) K based on the flow rate of exhaust gas, and a late post-injection amount calculating unit (basic variable calculating unit) 87 that calculates the basic variable using a preset DOC transfer function model.

More specifically, the late post-injection amount calculating unit 87 calculates a late post-injection amount Z as a basic variable using a deviation e of a measured DOC inlet temperature from the target DPF inlet temperature, design parameter (adjusting parameter) σ, and a control gain K determined from the flow rate of exhaust gas, by a relational expression of the primary transfer function $Z=K/(1+\sigma s)e$.

The control flow of the feedforward controller 81 will be described with reference to FIG. 6.

Figure 7:
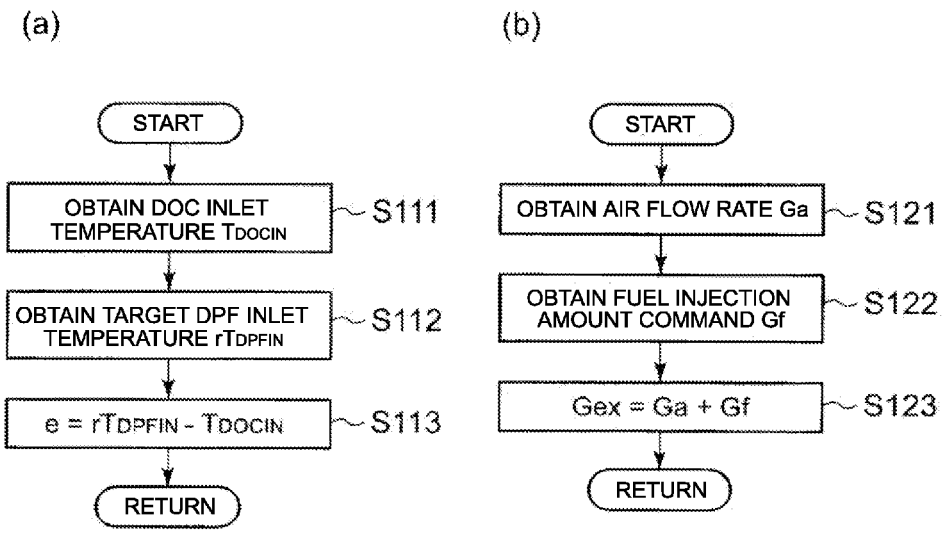
FIG. 7(a) and FIG. 7(b) are subroutine flowcharts showing steps of the flowchart of FIG. 6 in detail.

First, the temperature deviation e is calculated at step S110. More specifically, as shown in FIG. 7(a), the DOC inlet temperature $T_{DOCIN}$ is obtained at step S111, and the target DPF inlet temperature $rT_{DPFIN}$ is obtained at step S112. The temperature deviation e is calculated at step S113 by $e=rT_{DPFIN}-T_{DOCIN}$.

Figure 6:
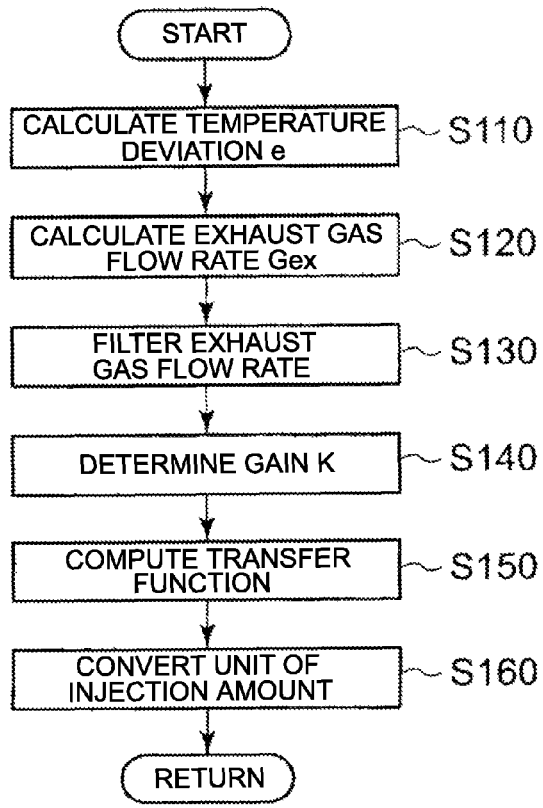
FIG. 6 is a control flowchart of the second embodiment.

The flow rate of exhaust gas $G_{ex}$ is calculated at step S120 in the flow of FIG. 6. This flow rate $G_{ex}$ is calculated similarly to step S11 as has been described in the foregoing. More specifically, as shown in FIG. 7(b), the flow rate is calculated by $G_{ex}=G_a+G_f$ at step S123, based on the flow rate of air $G_a$ obtained from the air flowmeter 35 at step S121, and the fuel injection command $G_f$ obtained from the common rail fuel injection system (not shown) at step S122.

Figure 9:
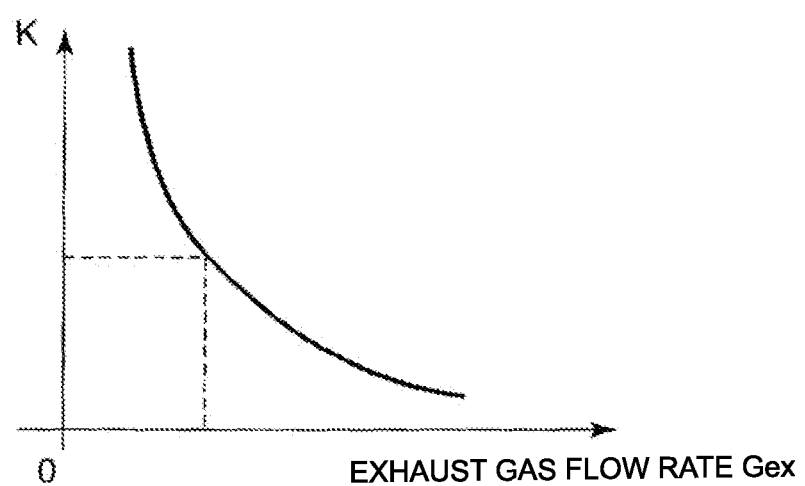
FIG. 9 is a characteristics chart for explaining a gain K map.

Next, at step S130 in the flow of FIG. 6, the exhaust gas flow rate input is filtered using a low path filter 89 and by a primary delay process to remove noise. After that, at step S140, the control gain K is determined. The control gain K is obtained from a gain K map 91 such as the one shown in FIG. 9, whereby a gain K is given relative to a certain exhaust gas flow rate. This gain K map 91 is determined in advance based on test data or through simulation and calculation.

Step S150 computes a transfer function. The late post-injection amount Z, which is the basic variable, is determined using a relational expression of the primary transfer function $Z=K/(1+\sigma s)e$, wherein e is the deviation of a measured DOC inlet temperature from the target DPF inlet temperature, $\sigma$ is the design parameter (adjusting parameter), and K is the control gain determined from the flow rate of exhaust gas. The smaller $\sigma$ is set, the higher the sensitivity of the output will be relative to changes in temperature deviation e and K, and the larger $\sigma$ is set, the lower the responsivity.

After that, at step S160, the unit of the injection amount calculated at step S150 is converted to compute a command value, and the process is returned.

In this way, the late post-injection amount, which is the basic variable, is calculated using a control gain, which is a control value determined from the exhaust gas flow rate, instead of calculating a basic injection amount as a feedforward control command 57 using a feedforward control map 45 that defines proper basic variables at various operating condition points, as with the feedforward controller 47 of the first embodiment. Therefore, as compared to using a map prepared based on various operating conditions beforehand, the feedforward variables can be properly determined under various operating conditions of a small general-purpose engine, in which the rpm and the load independently change in use, and thus the controllability of the DPF inlet temperature can be improved.

Since the late post-injection amount, which is the basic variable, is determined based on the deviation of the measured DOC inlet temperature from the target value of the DPF inlet temperature, the integrator 53 of the PID controller 63 does not output a large value, i.e., a large deviation from the target DPF inlet temperature is unlikely to occur, so that a loss of the controllability the DPF inlet temperature is prevented under an operating condition in which the flow rate of exhaust gas remains low after a drop in the exhaust gas flow rate in a short time.

It goes without saying that the configurations of the first and second embodiments can be combined. In this case, the feedforward controller 81 may be configured as in the second embodiment, and the integrator 53 of the PID controller 63 in the feedback controller 49 may include the integrator resetter 55. With such a configuration, the controllability of the DPF inlet temperature can be improved even more.

INDUSTRIAL APPLICABILITY

The present invention enables stable control to keep the DPF inlet temperature at a target level even when the flow rate of exhaust gas remains low for a while after a drop in the flow rate, and therefore can be suitably applied to a diesel engine exhaust gas purification system.

The invention claimed is:

1. An exhaust gas purification system for an internal combustion engine that includes a diesel oxide catalyst (DOC) and a diesel particulate filter (DPF) for collecting particulate matter (PM) in exhaust gas in an exhaust gas passage and that treats the PM collected in the DPF to regenerate the DPF, the system comprising:

a regeneration control unit controlling a temperature raising unit, when the PM has accumulated more than a predetermined amount, to heat up the DPF to around a predetermined target temperature and burn off the accumulated PM, the regeneration control unit including a feedforward controller outputting a basic variable for the temperature raising unit based on an operating condition of the internal combustion engine, a feedback controller outputting a correcting variable for achieving the target temperature of the DPF, and a variable adding unit adding the correcting variable output from the feedback controller to the basic variable output from the feedforward controller to compute a manipulated variable, the system further comprising:

at least one of an integrator resetter resetting an integral value of an integrator forming the feedback controller when a sudden drop in exhaust gas flow rate is detected based on a monitored exhaust gas flow rate or a control value calculated from the exhaust gas flow rate, and a basic variable calculating unit calculating the basic variable to be output from the feedforward controller based on the exhaust gas flow rate or a control value calculated from the exhaust gas flow rate.

2. The exhaust gas purification system for an internal combustion engine according to claim 1, wherein the integrator resetter determines that there has been a sudden drop in the exhaust gas flow rate when the rate of change of exhaust gas flow rate shows a decrease rate of less than a threshold.

3. The exhaust gas purification system for an internal combustion engine according to claim 1, wherein the integrator resetter determines that there has been a sudden drop in the exhaust gas flow rate when the exhaust gas flow rate has decreased to less than a threshold.

4. The exhaust gas purification system for an internal combustion engine according to claim 1, wherein the integrator resetter determines that there has been a sudden drop in the exhaust gas flow rate when the exhaust gas flow rate shows a decrease rate of less than a threshold, as well as when the exhaust gas flow rate has decreased to less than a threshold.

5. The exhaust gas purification system for an internal combustion engine according to claim 3, wherein determination is made that there has been a sudden drop in the exhaust gas flow rate when the exhaust gas flow rate remains less than the threshold for more than a certain period of time.

6. The exhaust gas purification system for an internal combustion engine according to claim 1, wherein the integral value of the integrator forming the feedback controller is reset when the integral value is positive.

7. The exhaust gas purification system for an internal combustion engine according to claim 1, wherein the basic variable calculating unit calculates the basic variable by using an equation of a preset transfer function modeling temperature rising characteristics of the exhaust gas in the DOC in use of a deviation of a measured DOC inlet temperature from the target DPF inlet temperature, and a control gain calculated based on the exhaust gas flow rate.

8. The exhaust gas purification system for an internal combustion engine according to claim 1, wherein the manipulated variable of the temperature raising unit represents an amount of late post-injection that is performed in a period after a main injection and that does not directly contribute to combustion, after activation of the DOC.

9. The exhaust gas purification system for an internal combustion engine according to claim 4, wherein determination is made that there has been a sudden drop in the exhaust gas flow rate when the exhaust gas flow rate remains less than the threshold for more than a certain period of time.

10. The exhaust gas purification system for an internal combustion engine according to claim 2, wherein the manipulated variable of the temperature raising unit represents an amount of late post-injection that is performed in a period after a main injection and that does not directly contribute to combustion, after activation of the DOC.

11. The exhaust gas purification system for an internal combustion engine according to claim 3, wherein the manipulated variable of the temperature raising unit represents an amount of late post-injection that is performed in a period after a main injection and that does not directly contribute to combustion, after activation of the DOC.

12. The exhaust gas purification system for an internal combustion engine according to claim 4, wherein the manipulated variable of the temperature raising unit represents an amount of late post-injection that is performed in a period after a main injection and that does not directly contribute to combustion, after activation of the DOC.

13. The exhaust gas purification system for an internal combustion engine according to claim 5, wherein the manipulated variable of the temperature raising unit represents an amount of late post-injection that is performed in a period after a main injection and that does not directly contribute to combustion, after activation of the DOC.

14. The exhaust gas purification system for an internal combustion engine according to claim 6, wherein the manipulated variable of the temperature raising unit represents an amount of late post-injection that is performed in a period after a main injection and that does not directly contribute to combustion, after activation of the DOC.

15. The exhaust gas purification system for an internal combustion engine according to claim 7, wherein the manipulated variable of the temperature raising unit represents an amount of late post-injection that is performed in a period after a main injection and that does not directly contribute to combustion, after activation of the DOC.

16. The exhaust gas purification system for an internal combustion engine according to claim 9, wherein the manipulated variable of the temperature raising unit represents an amount of late post-injection that is performed in a period after a main injection and that does not directly contribute to combustion, after activation of the DOC.

* * * * *